(12) United States Patent
Sathe et al.

(10) Patent No.: US 10,846,066 B2
(45) Date of Patent: Nov. 24, 2020

(54) BUILD AND DEPLOY CLOUD DEVICE APPLICATION ON CLOUD AND DEVICES

(71) Applicant: Rapyuta Robotics Co., Ltd, Tokyo (JP)

(72) Inventors: Dhananjay Sathe, Tokyo (JP); Vivek Bagade, Tokyo (JP); Hitesh Sethi, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 0 days.

(21) Appl. No.: 16/035,406

(22) Filed: Jul. 13, 2018

(65) Prior Publication Data

US 2019/0087161 A1    Mar. 21, 2019

Related U.S. Application Data

(60) Provisional application No. 62/559,938, filed on Sep. 18, 2017.

(51) Int. Cl.
*G06F 8/35* (2018.01)
*G06F 8/61* (2018.01)
(Continued)

(52) U.S. Cl.
CPC .............. *G06F 8/35* (2013.01); *G06F 8/63* (2013.01); *G06F 8/71* (2013.01); *G06F 9/542* (2013.01); *G06F 9/546* (2013.01); *G06F 11/3006* (2013.01); *G06F 11/3476* (2013.01); *H04L 12/2854* (2013.01); *H04L 41/082* (2013.01); *H04L 41/142* (2013.01); *H04L 41/5051* (2013.01); *H04L 41/5096* (2013.01);
(Continued)

(58) Field of Classification Search
CPC ........................................................ G06F 8/63
See application file for complete search history.

(56) References Cited

U.S. PATENT DOCUMENTS

| | | | | |
|---|---|---|---|---|
| 8,214,079 B2* | 7/2012 | Lee | ...................... | G05D 1/0274 700/245 |
| 8,386,078 B1* | 2/2013 | Hickman | ............... | G01C 21/20 700/245 |

(Continued)

OTHER PUBLICATIONS

Hu, Guoqiang, Wee Peng Tay, and Yonggang Wen. "Cloud robotics: architecture, challenges and applications." IEEE network 26.3 (2012): 21-28. (Year: 2012).*

(Continued)

*Primary Examiner* — Matthew J Brophy
(74) *Attorney, Agent, or Firm* — Trupti P. Joshi

(57) ABSTRACT

A system and method to build and deploy a cloud device application a cloud and a plurality of devices has been described. Initially a selection of software executable code and runtime architecture of one of the cloud and the plurality of devices is received for deploying the cloud device application including the software executable code. Next a builder image is selected for generating a software executable image corresponding to the software executable code. Next a build process is executed to generate the software executable image corresponding to the software executable code based on the selected builder process. Finally the generated software executable image on one of the cloud and one of the plurality of devices is deployed based on the runtime architecture.

20 Claims, 5 Drawing Sheets

(51) Int. Cl.
*G06F 8/71* (2018.01)
*G06F 9/54* (2006.01)
*G06F 11/30* (2006.01)
*G06F 11/34* (2006.01)
*H04L 29/08* (2006.01)
*H04L 12/24* (2006.01)
*H04L 29/06* (2006.01)
*H04L 12/28* (2006.01)

(52) U.S. Cl.
CPC ............ *H04L 63/101* (2013.01); *H04L 67/10* (2013.01); *H04L 67/12* (2013.01); *H04L 67/125* (2013.01); *H04L 67/2809* (2013.01); *H04L 67/34* (2013.01); *G06F 2201/835* (2013.01); *H04L 41/0853* (2013.01); *H04L 63/0823* (2013.01)

(56) References Cited

U.S. PATENT DOCUMENTS

| | | | | |
|---|---|---|---|---|
| 8,639,787 | B2* | 1/2014 | Lagergren | G06F 15/177 709/222 |
| 8,856,294 | B2* | 10/2014 | Lagergren | H04L 41/0806 709/222 |
| 9,280,335 | B2* | 3/2016 | Adi | G06F 8/63 |
| 9,690,566 | B2* | 6/2017 | Vinograd | G06F 8/65 |
| 9,718,188 | B2* | 8/2017 | Stubbs | G05B 19/418 |
| 9,727,330 | B2* | 8/2017 | Parees | G06F 8/60 |
| 9,846,843 | B2* | 12/2017 | Howard | B25J 11/003 |
| 9,987,748 | B2* | 6/2018 | Stubbs | G06Q 10/087 |
| 10,152,595 | B2* | 12/2018 | Wiest | G06F 21/55 |
| 10,259,117 | B2* | 4/2019 | Shaw | B25J 9/1661 |
| 2008/0243305 | A1* | 10/2008 | Lee | G05D 1/0297 700/246 |
| 2012/0081395 | A1* | 4/2012 | Adi | G06F 8/63 345/634 |
| 2012/0084769 | A1* | 4/2012 | Adi | G06F 8/63 717/174 |
| 2012/0266169 | A1* | 10/2012 | Lagergren | G06F 15/177 718/1 |
| 2014/0129819 | A1* | 5/2014 | Huang | G06F 9/4416 713/2 |
| 2015/0046921 | A1* | 2/2015 | Allen | G06F 3/065 718/1 |
| 2016/0098262 | A1* | 4/2016 | Spivak | G06F 8/71 717/170 |
| 2016/0147529 | A1* | 5/2016 | Coleman | G06F 8/63 717/120 |
| 2016/0378456 | A1* | 12/2016 | Chai | G06F 8/65 717/169 |
| 2017/0297200 | A1* | 10/2017 | Stubbs | G05B 19/418 |
| 2017/0315795 | A1* | 11/2017 | Keller | G06F 11/3409 |
| 2017/0337054 | A1* | 11/2017 | Parees | G06F 8/30 |
| 2017/0368683 | A1* | 12/2017 | Qiu | H04L 67/22 |
| 2018/0036878 | A1* | 2/2018 | Shaw | G06F 9/45558 |
| 2019/0022856 | A1* | 1/2019 | Kullang | G06F 8/656 |
| 2019/0057314 | A1* | 2/2019 | Julian | G06F 8/65 |
| 2019/0087161 | A1* | 3/2019 | Sathe | G06F 9/546 |

OTHER PUBLICATIONS

Chen, Yinong, Zhihui Du, and Marcos Garcia-Acosta. "Robot as a service in cloud computing." 2010 Fifth IEEE International Symposium on Service Oriented System Engineering. IEEE, 2010. (Year: 2010).*

* cited by examiner

BUILD AND DEPLOY CLOUD DEVICE APPLICATION ON CLOUD AND DEVICES

This application claims priority under 35 U.S.C. § 119(e) to provisional application No. 62/559,938 filed on Sep. 18, 2017, the contents of which are hereby incorporated by reference in their entirety.

TECHNICAL FIELD

The present invention relates generally to cloud device application and more particularly to building and deploying cloud device application on cloud and heterogeneous devices.

BACKGROUND

Cloud computing and robotics are two areas that have grown exponentially in the last decade. Cloud computing is delivery of computing services over a cloud. Cloud computing allows a company to easily scale their operation by utilizing the elastic computing resources available over the cloud. Robotics deals with the design, construction, operation, and use of robots, as well as the collaboration of the robot with computer system for control, feedback, and information processing related to robots.

Both, these technologies provide different advantages. Currently, cloud robotics is an emerging field that attempts to use cloud technologies for the field of robotics. Currently, different parts of the cloud robotics application are written by different developers in different programming languages. For example, consider that a drone solution is to be built that allows a user to plan a drone mission.

To build the drone solution, a frontend developer needs to write an application manifest in a frontend language that allows the user to plan a mission for the drone and view the drone activities during the drone's flight. Further, a robotics engineer need to write an on board manifest in a hardware programming language for the drone on-board component that allows the drone to receive the instruction from the application and execute the mission. Each of these application manifest needs to be build and deployed separately, which is time consuming and cumbersome.

DETAILED DESCRIPTION

Figure 1:
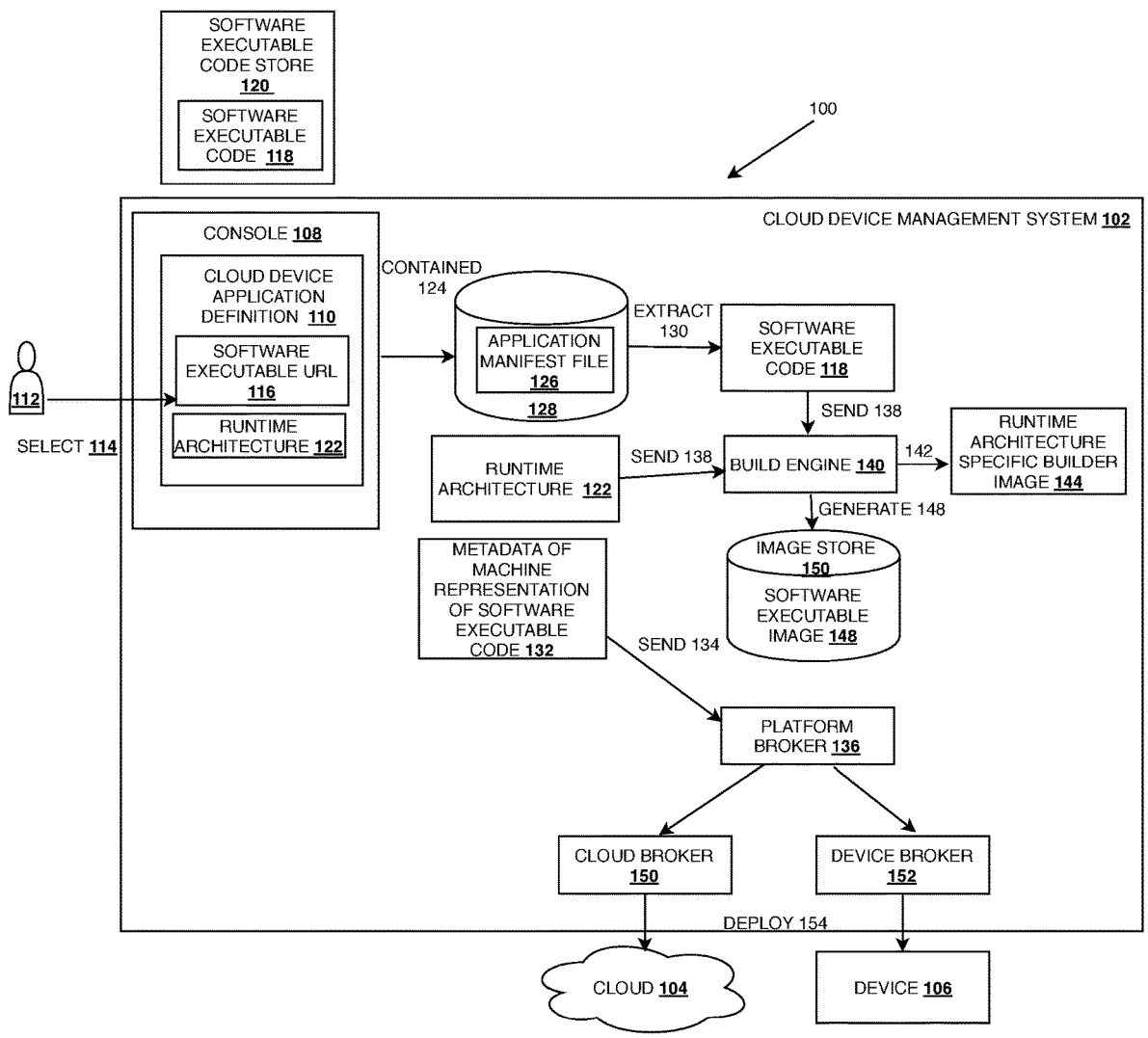
FIG. 1 is a block diagram illustrating a system to build and deploy a cloud device application, according to an embodiment.

Embodiments of techniques to build and deploy cloud device application on cloud and devices are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Connecting robots or devices to the cloud allows offloading heavy computation and storage of the robots or devices to the cloud. This is helpful in reducing the weight and enhancing computation performance of the device and/or robot. Despite the various advantages of cloud connected robots building and deploying cloud device application is cumbersome, as discussed above.

In one embodiment, a cloud device management system 102 is proposed that generates an executable image, of source code provided by a developer, which may be deployed at cloud or device. A software executable is a service that provides one or more cloud and/or device related functionalities. For example, the software executables may include navigation software executable (device specific software executable), mapping service (device specific software executable), datastore service (cloud specific software executable), messaging service (cloud specific software executable), caching service (cloud specific software executable), etc. In one embodiment, the software executable is a web service that exposes public or private endpoints (i.e., name, protocol, and port) using web protocols. The cloud device application may select one or more of the software executables depending on the functionalities that the user wants to provide by the application.

The cloud device management system automatically handles the build process for these software executables, written in any software programming language, by converting them to a software executable image that may be deployed at a cloud or device. To generate the software executable image, the cloud device management system may analyze the runtime architecture of the software as well as target at which the software executable image is to be deployed and then selected a matching builder image. A builder image is a specialized container image that produces software executable image. Builder image may include various software components required for running a deployed instance of source code as well as software to aid detection of source characteristics (frameworks languages etc). For example, builder images may include operating system libraries, language runtimes, middleware, and source-to-image tooling. When a builder image is executed, it injects the developer's source code into the builder image and produces a software executable image. Builder images are available for both cloud and device side.

An image, such as a builder image, refers to data representing executables and files of an application used to deploy functionality for a runtime architecture instance of the application. For example, when the software executable is a Robot Operating System (ROS) code then the builder image may be a ROS distribution, for example ROS kinetic Kame and an Ubuntu Operating System. The builder images may be automatically updated when a newer version of the software is available.

The cloud device management system also allows a user to select a runtime architecture for the software executable. A runtime architecture of the software executable may define the deployment destination of the software executable image/s included in the application. For example, the runtime architecture may be a device architecture or a cloud architecture. The software executable is deployed at a device or cloud having the selected runtime architecture at which the software executable is to be deployed. Based on the selection, the different software executables are deployed to the cloud or the device.

A device is an object or a physical entity having a unique identifier and an ability to transfer data. In one embodiment, the device is a 'thing' in the Internet of Things (IoT). A thing, in the IoT context, refers to an entity or physical object that has a unique identifier, an embedded system, and the ability to transfer data over a network. These devices may include physical devices, home appliances, vehicles, edge devices, fog devices, etc. The device also includes robots that can perform actuation and sensing along with other device functionalities. A cloud 104 is a collection of configurable system resources and services that can be rapidly provisioned with minimal management effort over a network, for example, Internet. The cloud provides several resources including computing power, storage, and other IT resources.

FIG. 1 is a block diagram illustrating a system 100 to build and deploy a cloud device application, according to an embodiment. The system includes a cloud device management system 102 that includes components for building and deploying a cloud device application at a cloud 104 or a device 106. Initially at a console 108, a cloud device application definition 110 is received for selecting software executables to be included in a cloud device application and the corresponding runtime architecture for the software executables. The user 112 may select 114 software executable as a software executable image that may be deployed at the cloud 104 or device 106. In case the user wants to add a software executable code then a software executable Uniform resource locator (URL) 116 that has the address of the software executable code 118 included in a software executable code store 120 is provided at the cloud device application definition 110. A runtime architecture 122 corresponding to the selected software executable is also provided at the cloud device application definition 110.

The cloud device management system 102 is a Platform-as-a-Service (PaaS) framework including several software and hardware components that allows building, provisioning, and deploying a cloud device application at a cloud or device.

A cloud device application is an application that executes at the cloud and/or one or more devices to perform a particular action. For example, a cloud device application may be an orthomap generation application that executes on the cloud and an unmanned aerial vehicle (UAV) (device). At the UAV, the orthomap application executes to capture images and videos using the UAV camera. The application then sends the captured images and videos to a cloud. The orthomap application then executes at the cloud to generate an orthomap based on the captured images.

Next, the received selection at the cloud device application definition 124 is contained in the application manifest file 126. In one embodiment, the application manifest file 126 is a JavaScript Object Notation (JSON) file including a set of instructions for building deploying, and provisioning the cloud device application at the cloud and/or on the device. The instructions included in the application manifest file 126 may include the name and address of software executable and the runtime architecture 122 corresponding to the application service. The application manifest file 126 may be stored at an object database 128.

Next when the cloud device application definition 110 is submitted at the console 108 then a build process is triggered. In one embodiment the build process refers to the process by which source code is converted into a stand-alone image that can be deployed and executed at the cloud 104 or the device 106. During a software build process a compilation process may be performed where source code files are converted into executable code.

To initiate the build process, the software executable code 118 and the corresponding runtime architecture 122 is extracted 130 based on the information stored at the application manifest file 126. In one embodiment, the software executable code 118 may be extracted in case the software executable URL redirects to a software executable image in a software executable image store (not shown). In one embodiment, the metadata required for a machine representation of the software executable code 132 is also extracted 130 from the application manifest file 126. This metadata of the machine representation of the software executable code 118 (132) is sent 134 to a platform broker 136 that stores the machine representation of the software executable code in itself and in components in any required sub brokers (cloud broker 152 and device broker 154)

Next the software executable code 118 and the runtime architecture 122 is send 138 to a build engine 140. Based on the received runtime architecture 122, the build engine 140 selects 142 a runtime architecture specific builder image 144. For example, when a builder image is a device with ARM 32 bit architecture then the builder image selected may be specific to the ARM 32 bit architecture, i.e., the builder image may include different software components that are required for executing the software executable at a device with an ARM 32 bit processor. The build engine 140 injects the software executable code 118 to a supported builder image to generate 146 a software executable image 148 that is stored in a software executable image store 150. A reference of the generate software executable image 148 is send to the platform broker 136. This reference is then injected into the machine representation(s) previously stored in the platform broker 136 and sub brokers (cloud broker 152 and device broker 154)

When a deployment request is received at the console 108 then the platform broker 136 and its sub-brokers (cloud broker 152 and device broker 154) uses the machine representation that includes the references to the software executable image 148 to deploy 154 the application.

In one embodiment, the cloud broker 152 and the device broker 154 checks whether the cloud 104 or the device 106 has the required Operating System version, mechanism to establish connection with the cloud device management system 102 for example a publisher-subscriber or master-slave node, and send logs or metrices of the device 106 to the cloud device management system 102. In case the executable is a ROS executable then ROS master, a ROS version and Ubuntu OS may be downloaded on the device.

In case, the required software components are installed at the cloud 104 or the device 106 then the software executable image 148 is installed at the cloud 104 or device 106.

Figure 2:
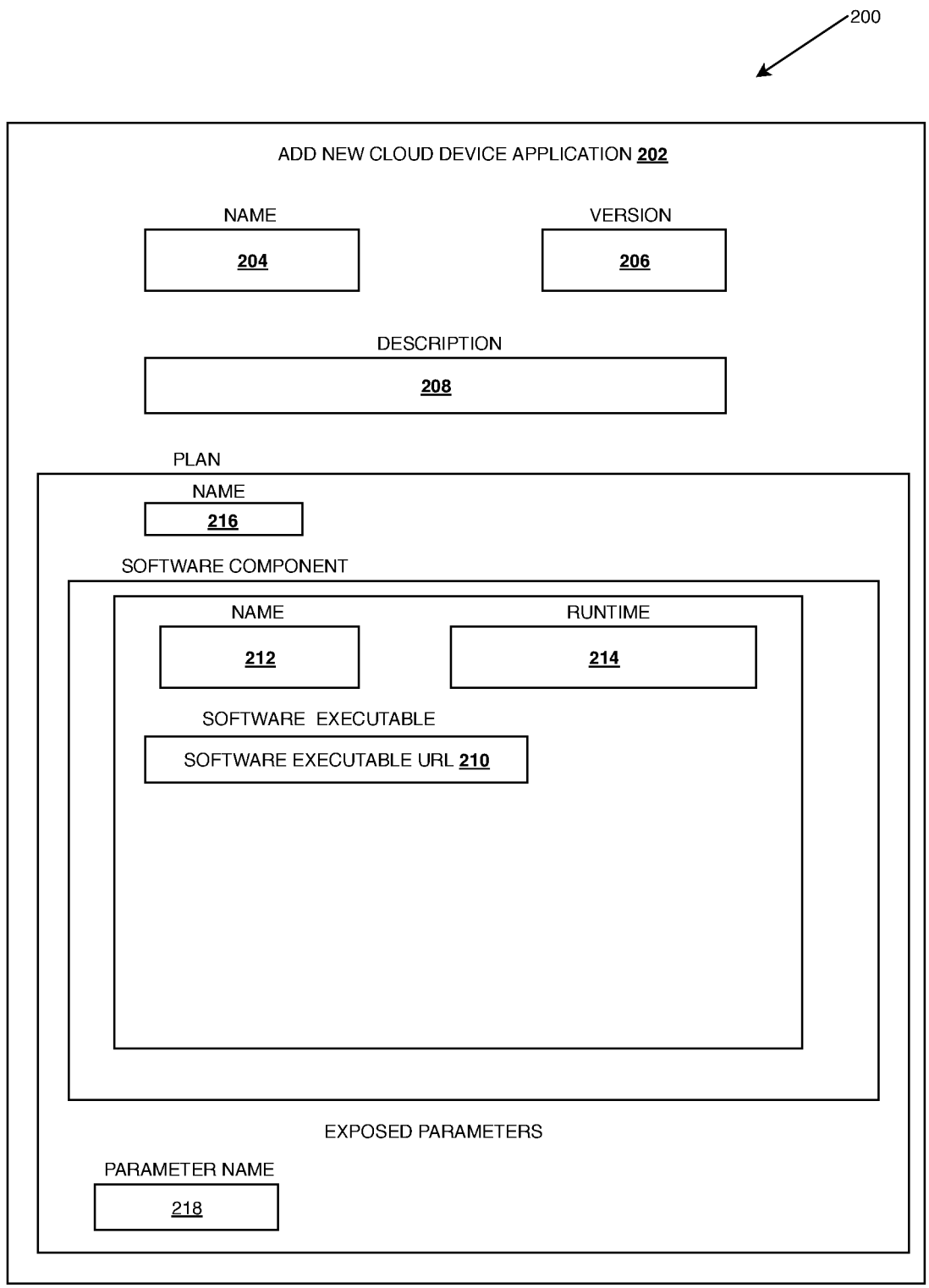
FIG. 2 is an exemplary screenshot of a user interface (UI) at a cloud device management system to define a cloud device application, according to an embodiment.

FIG. 2 is an exemplary screenshot of a user interface (UI) 200 at a cloud device management system to define a cloud device application, according to an embodiment. In one embodiment, developer selects an "add new cloud device application" tab (not shown) that opens an "add new cloud device application" form 202 for adding a new application cloud device application. In one embodiment, the new cloud device application is to be added to a cloud robotics application store (not shown) that is a categorized, tagged, and user rated collection of cloud device application. An application added to the cloud device robotics application store can be selected and added to another application to generate a more complex cloud device application. A user provides name 204, version 206, and description 208 of the application and/or software executable at the form 202. The user provides a software executable URL 210 of the software executables that the user wants to be included in the cloud device application. The software executable URL 210 that directs to a software executable code in a software executable code store. In this case, the cloud device management system generates a software executable image by running a build process, explained in FIG. 1, when the "add new cloud device application form" 202 is submitted at the UI 200. Further, the software executable URL 210 may also direct to a software executable image stored in a software executable image store, for a particular software executable.

In one embodiment, the software executable may be a part of a software component represented by a software component name 212 and a runtime architecture 214 at which the software component is to be deployed. A software component is a set of software executables that are to be deployed in unison on the desired target runtime. In one embodiment, executables can share a specified file system ensuring data locality, and can communicate via IPC. Further, any software executable listening on a port can be accessed by its sibling software executables via localhost.

In one embodiment, several software components may be selected for the cloud device application. Deploying a cloud device application includes deploying the different software components at the defined runtime, i.e., cloud and/or device. In one embodiment, different plans may be selected for a cloud device application. Each plan may include a different selection of software components and configuration. For example, consider a drone teleoperation application that has a video capturing component, a front end component to view the captured video, and a storage component to store the captured image. In one plan, all three software components may be included and in another plan the storage component may not be included.

When deploying the application a user selects a plan of the application that is to be deployed. Based on the selection the components included in the selected plan are deployed at the cloud and/or device. As shown, a plan with a name 216 that includes the software component 212 is added to the cloud device application 202. In one embodiment exposed parameter having a parameter name 218 is also included in the cloud device application. Exposed parameters are parameters that the cloud device application exposes to another cloud device application to allow these application or services to use the application. For example, username, password, and database store may be exposed parameters defined for a database application. Whenever an application or service selects the database application then the username, password, and database store variables of a cloud database, where the database application is deployed, are retrieved and provided to the application.

Next when the provided selection at the cloud device application is submitted to the catalog then the different selections received at the new cloud device application 202 is stored as an application manifest. The information stored at the application manifest may then be used to build the application. During the build process, a software executable image of the software executable code available at the software executable URL 210 is generated.

Figure 3:
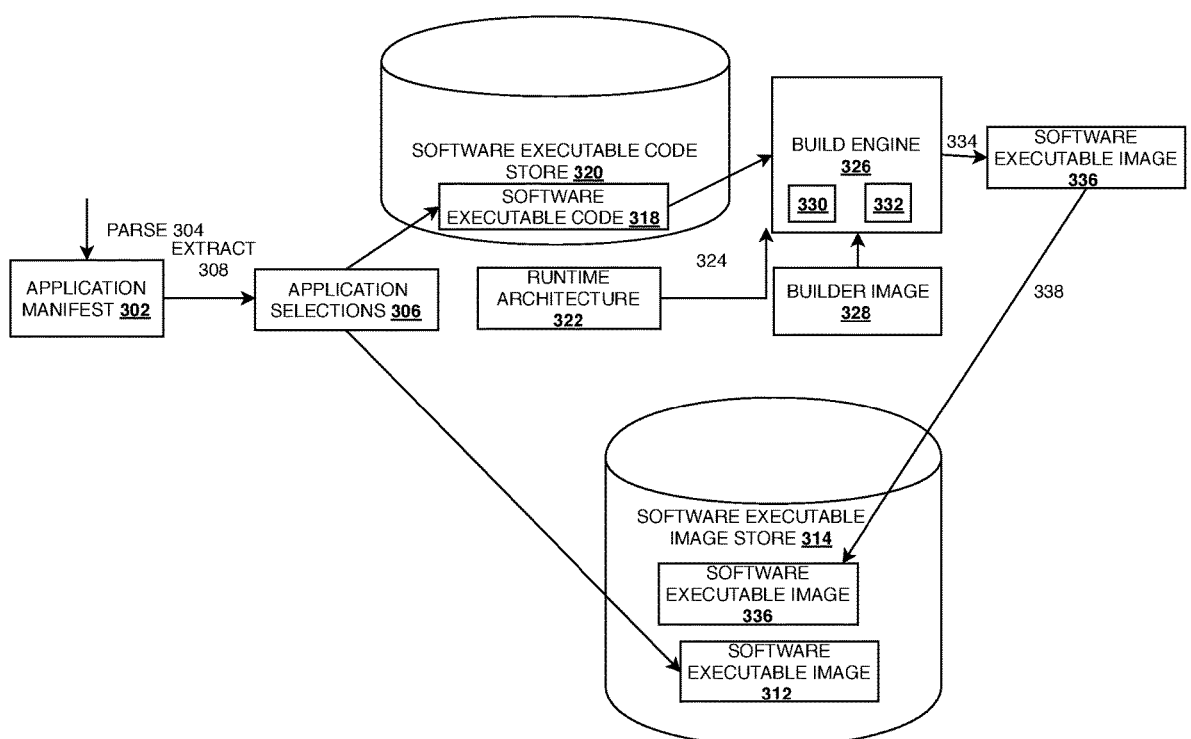
FIG. 3 is a block diagram illustrating a process to build a cloud device application, according to an embodiment.

FIG. 3 is a block diagram illustrating a process 300 to build a cloud device application, according to an embodiment. In one embodiment, when the build process is initiated then the application manifest 302 is parsed 304 and the stored application selections 306, for example the application selections received in FIG. 2, including executable URL, the runtime architecture corresponding to the executables and dependencies, are extracted 308. Next in case the software executable URL in the application selection 306 is an address that redirects 310 to a software executable image 312 in a software executable image store 314 then the build process is not executed for the software executable. In case the software executable URL in the application selection 306 is an address that redirects 316 to a software executable code 318 in a software executable code store 320 then a build process is triggered. The software executable code 318 and corresponding runtime architecture 322 is send 324 to a build engine 326. At the build engine 326, a builder image 328 is selected corresponding to the runtime architecture specific software executable code to inject the software executable code 318 to the builder image 328. In one embodiment, the build engine includes an architecture specific software emulators, for example 330 and 332. These emulators store the code to convert the software executable, for a particular runtime architecture into a software executable image. In one embodiment the build engine 326 redirects the received software executable code 318 to a corresponding emulator that then generates 334 the software executable image 336. Injecting the builder image to the software executable code 318 generates 334 the software executable image 336 that includes the software executable code 318 and the builder image 328. Finally the generated software executable image is send 338 to the software executable image store 314 to store the software executable image 336 at the software executable image store 314.

Figure 4:
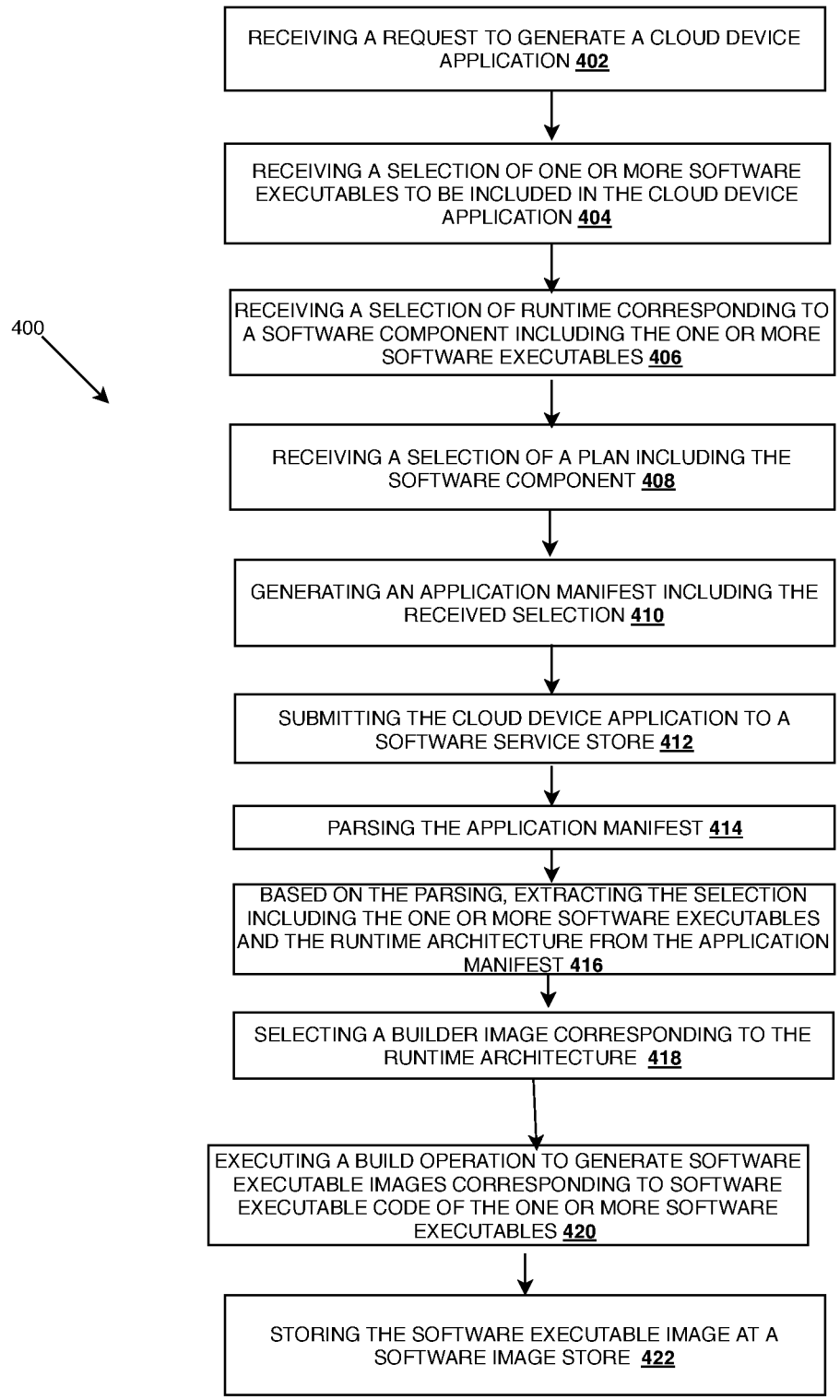
FIG. 4 is a block diagram illustrating a process to execute a build operation for a cloud device application, according to an embodiment.

FIG. 4 is a block diagram illustrating a process 400 to execute a build operation for a cloud device application, according to an embodiment. Initially, as shown in FIG. 2, a request is received to generate a cloud device application at a console of the cloud device management system (402). Based on the received request, a selection of one or more software service executables to be included in the cloud device application (404). A selection of a runtime architecture is next received corresponding to a software component including the one or more software service executables (406). In one embodiment, the different software executables in a software component have the same runtime. In one embodiment, a user may provide a particular system property as a runtime. For example, a user may select an "x86 processor" as a runtime. In this case, the software executable may be executed in any connected device having an x86 processor.

Next a plan may be selected including the software component (408). The plan may include any combination of software components and configuration. For example, consider an application that has five software components, including a database component that stores data generated during execution of the application. In this case, a user selection may be received for two plans: a plan 1 that includes all the five software components and a plan 2 that includes four components excluding the database component.

Next an application manifest is generated including the received selection at 404-408 (410). Next at 412, the cloud device application is added to the application store based on the received request at 402 and the selections received at 404-410. A build operation then triggered by parsing the application manifest generated at 410 (414). Based on the parsing, the selections 404-408 including the selected one or more software executable address and the corresponding software architecture are extracted from the application manifest (416). The software executable address may be the software executable URL that redirects to a software executable code or a software executable image. Next, a builder image is selected corresponding to the runtime architecture (418). Next a build operation is executed to generate software executable images corresponding to the software executable code of the one or more software executables extracted from the application manifest based on the selected builder image (420). In one embodiment, the user can view at the console the progress of build process. For example, the user can view the progress of the build operation. Finally the generated software executable image is stored at a software image store. (422)

Figure 5:
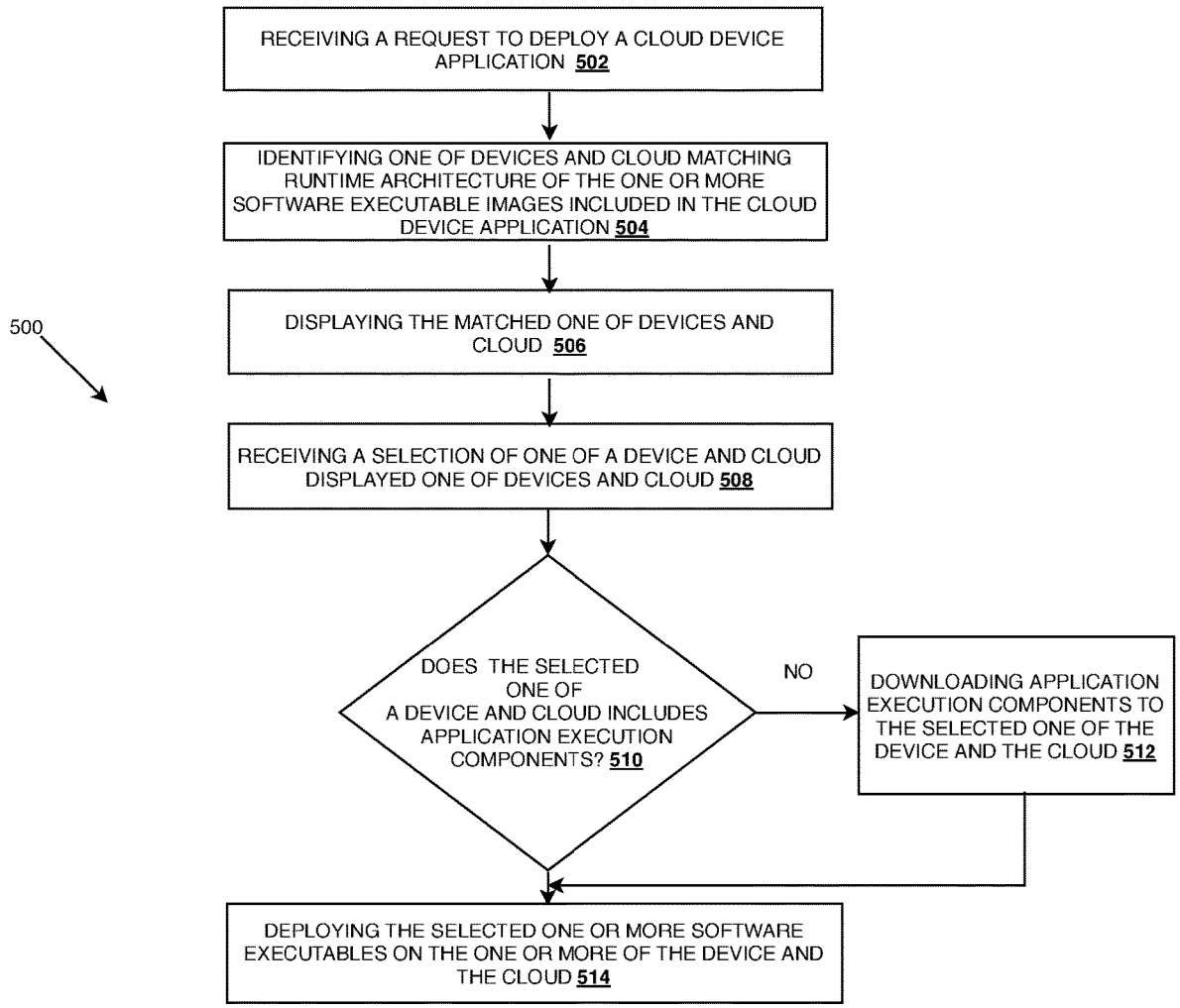
FIG. 5 is a block diagram illustrating a process 500 to deploy a cloud device application, according to an embodiment.

FIG. 5 is a block diagram illustrating a process 500 to deploy a cloud device application, according to an embodiment. Initially a request is received at a console of the cloud device management system to deploy the cloud device application (502). Based on the received request, the cloud device system identifies one of devices and cloud, connected to the cloud device management system, matching the runtime architecture of the one or more software executable images includes in the cloud device application (504). For example, when the runtime architecture is an ARM 32 bit processor then all devices having the ARM 32 bit processor that are connected to the cloud device management system are identified.

Next the matched one of the devices and cloud are displayed at a console of the cloud device management system (506). A selection is then received of one of the device and cloud from the displayed devices and cloud (508). Next a check is performed to determine whether the selected one of device and cloud includes application execution components (510). In case the application execution components are not downloaded to the one of the device and cloud then the application execution components are downloaded to one of the device and the cloud (512).

Finally after the application execution components are deployed to the one of the device and the cloud then the one or more software executable images included in the application are downloaded to one of the cloud and the device (514).

The foregoing diagrams represent logical architectures for describing processes according to some embodiments, and actual implementations may include one or more components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of protocol(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code read from one or more of non-transitory computer-readable media, such as a floppy disk, a CD-ROM, a DVD-ROM, a Flash drive, a magnetic tape, and solid state Random Access Memory (RAM) or Read Only Memory (ROM) storage units and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

The invention claimed is:

1. A computer implemented method to build and deploy a cloud device application on a cloud and a plurality of heterogeneous devices, the method comprising:
a cloud device management system, receiving a selections of software executable code and a runtime architecture of the cloud and the plurality of heterogeneous devices for deploying the cloud device application including the software executable code, wherein the software executable code includes at least one or more of device specific software component and a cloud specific software component, wherein the selection of software executable code and the runtime architecture is based on one or more web services provided for at least one of the cloud and the plurality of heterogeneous devices, the web service exposing one or more endpoints using one or more web protocols;
the cloud device management system, analyzing the runtime architecture of the cloud and the plurality of heterogeneous devices to select a builder image for generating a software executable image corresponding to the software executable code; executing a build process to generate the software executable image corresponding to the software executable code based on the selected builder image; and based on the runtime architecture, deploying the generated software executable image on the cloud and the plurality of heterogeneous devices, wherein the plurality of heterogeneous devices includes at least one of cloud connected robots, wherein deploying the generated software executable image comprises:
injecting a reference to the generated software executable image into a machine representation of the software executable code; and deploying, using at least one broker of a plurality of brokers, the generated software executable image using the reference injected machine representation of the software executable code, wherein at least one broker is configured to deploy to the cloud connected robot.

2. The computer implemented method according to claim 1,
wherein executing the build process comprises: parsing an application manifest to extract the software executable code and the corresponding runtime architecture, wherein parsing further includes: extracting metadata for the machine representation of the software executable code; and executing the build process on the extracted software executable code based on the runtime architecture.

3. The computer implemented method according to claim 2, further comprising: receiving selection of a software executable URL redirecting to the software executable code; receiving selection of runtime architecture corresponding to the selected software executable code; and generating the application manifest based on the received selection of the software executable URL and the runtime architecture.

4. The computer implemented method according to claim 1, further comprising: receiving a deployment request to deploy the cloud device application; based on the received request, identifying the cloud and one or more heterogeneous devices from the plurality of heterogeneous devices matching the runtime architecture corresponding to the software executable code; receiving a selection of one of the cloud and a heterogeneous device from the identified one of the cloud and the one or more heterogeneous devices for deploying the cloud device application; and deploying the software executable image at the selected one of the cloud and the heterogeneous device.

5. The computer implemented method according to claim 4, further comprising: determining whether the selected one of the cloud and the heterogeneous device includes one or more application execution components to execute the software executable image; and based on the determination, downloading the one or more application execution components to the selected one of the cloud and the heterogeneous device.

6. A computer system to build and deploy a cloud device application on a cloud and a plurality of heterogeneous devices, the system comprising: a memory to store instructions; and a processor to execute the instructions to:
 a cloud device management system, receive a selections of software executable code and a runtime architecture of the cloud and the plurality of heterogeneous devices for deploying the cloud device application including the software executable code, wherein the software executable code includes at least one or more of device specific software component and a cloud specific software component, wherein the selection of software executable code and the runtime architecture is based on one or more web services provided for at least one of the cloud and the plurality of devices, the web service exposing one or more endpoints using one or more web protocols;
 the cloud device management system, analyze the runtime architecture and the cloud and the plurality of heterogeneous devices to select a builder image for generating a software executable image corresponding to the software executable code; execute a build process to generate the software executable image corresponding to the software executable code based on the selected builder image; and based on the runtime architecture, deploy the generated software executable image on the cloud and the plurality of heterogeneous devices, wherein the plurality of devices includes at least one of cloud connected robots, wherein deploy the generated software executable image comprises:
 inject a reference to the generated software executable image into a machine representation of the software executable code; and deploy, using at least one broker of a plurality of brokers, the generated software executable image using the reference injected machine representation of the software executable code, wherein at least one broker is configured to deploy to the cloud connected robot.

7. The computer system according to claim 6, wherein the processor further executes the instructions to:
 parse an application manifest to extract the software executable code and the corresponding runtime architecture, extract metadata for the machine representation of the software executable code; and execute the build process on the extracted software executable code based on the runtime architecture.

8. The computer system according to claim 7, wherein the processor further executes the instructions to: receive selection of a software executable URL redirecting to the software executable code; receive selection of runtime architecture corresponding to the selected software executable code; and generate the application manifest based on the received selection of the software executable URL and the runtime architecture.

9. The computer system according to claim 6, wherein the processor further executes the instructions to: receive a deployment request to deploy the cloud device application; based on the received request, identify the cloud and one or more heterogeneous devices from the plurality of heterogeneous devices matching the runtime architecture corresponding to the software executable code; receive a selection of one of the cloud and a heterogeneous device from the identified one of the cloud and the one or more heterogeneous devices for deploying the cloud device application; and based on the runtime architecture, deploying the software executable image at the selected one of the cloud and the heterogeneous devices.

10. The computer system according to claim 9, wherein the processor further executes the instructions to: determine whether the selected one of the cloud and the heterogeneous device includes one or more application execution components to execute the software executable image; and based on the determination, download the one or more application execution components to the selected one of the cloud and the heterogeneous devices.

11. A non-transitory computer readable medium encoded with instructions that when executed by a computer causes the computer to:
 receive a selections of software executable code and a runtime architecture of the cloud and the plurality of heterogeneous devices for deploying the cloud device application including the software executable code, wherein the software executable code includes at least one or more of device specific software component and a cloud specific software component, wherein the selection of software executable code and the runtime architecture is based on one or more web services provided for at least one of the cloud and the plurality of heterogeneous devices, the web service exposing one or more endpoints using one or more web protocols;
 analyze the runtime architecture of the cloud and the plurality of heterogeneous devices to select a builder image for generating a software executable image corresponding to the software executable code;
 execute a build process to generate the software executable image corresponding to the software executable code based on the selected builder image;
 and based on the runtime architecture, deploy the generated software executable image on the cloud and the plurality of heterogeneous devices, wherein the plurality of devices includes at least one of cloud connected robots, wherein deploy the generated software executable image comprises:
 inject a reference to the generated software executable image into a machine representation of the software executable code; and deploy, using at least one broker of a plurality of brokers, the generated software executable image using the reference injected machine representation of the software executable code, wherein at least one broker is configured to deploy to the cloud connected robot.

12. The non-transitory computer readable medium according to claim 11 further including instructions which when executed by the computer causes the computer to:
 parse an application manifest to extract the software executable code and the corresponding runtime architecture, wherein said parse the application manifest further includes to: extract metadata for the machine representation of the software executable code; and execute the build process on the extracted software executable code based on the runtime architecture.

13. The non-transitory computer readable medium according to claim 12 further including instructions which when executed by the computer causes the computer to: receive selection of a software executable URL redirecting to the software executable code; receive selection of runtime architecture corresponding to the selected software executable code; and generate the application manifest based on the received selection of the software executable URL and the received selection of the runtime architecture.

14. The non-transitory computer readable medium according to claim 11 further including instructions which when executed by the computer causes the computer to: receive a deployment request to deploy the cloud device application; based on the received request, identify the cloud and one or more heterogeneous devices from the plurality of heterogeneous devices matching the runtime architecture corresponding to the software executable code; receive a selection of one of the cloud and a heterogeneous device from the identified one of the cloud and the one or more heterogeneous devices for deploying the cloud device application; and based on the runtime architecture, deploying the software executable image at the selected one of the cloud and the device.

15. The non-transitory computer readable medium according to claim 14 further including instructions which when executed by the computer causes the computer to: determine whether the selected one of the cloud and the heterogeneous devices includes one or more application execution components to execute the software executable image; and based on the determination, download the one or more application execution components to the selected one of the cloud and the heterogeneous devices.

16. The computer implemented method of claim 1 further comprising: receiving a selection of a plan for deploying the cloud device application, wherein the selected plan includes at least one or more of device specific software component and the cloud specific software component; and based on the selected plan, deploying the at least one or more of device specific software component and the cloud specific software component on the cloud and the plurality of heterogeneous devices.

17. The computer implemented method of claim 8 further comprising: verifying if the received software executable URL redirects to a software executable code or a software executable image; and triggering the build process if the received software executable URL redirects to the software executable code.

18. The computer implemented method of claim 1 further comprising: checking whether the cloud and the plurality of heterogeneous devices has the relevant OS version and can establish connection with cloud device management system, wherein the connection establishment is based on publisher-subscriber or master-slave connection.

19. The non-transitory computer readable medium according to claim 11 further including instructions which when executed by the computer causes the computer to: receive a selection of a plan for deploying the cloud device application, wherein the selected plan includes at least one or more of device specific software component and the cloud specific software component; and based on the selected plan, deploy the at least one or more of device specific software component and a cloud specific software component on the cloud and the plurality of heterogeneous devices.

20. The non-transitory computer readable medium according to claim 14 further including instructions which when executed by a computer causes the computer to: verify if the received software executable URL redirects to a software executable code or a software executable image; and trigger the build process if the received software executable URL redirects to a software executable code.

* * * * *